Nov. 4, 1952  C. W. WATSON  2,616,915
STABILIZATION OF FLUIDIZED IRON SYNTHESIS CATALYST
Filed Oct. 30, 1947
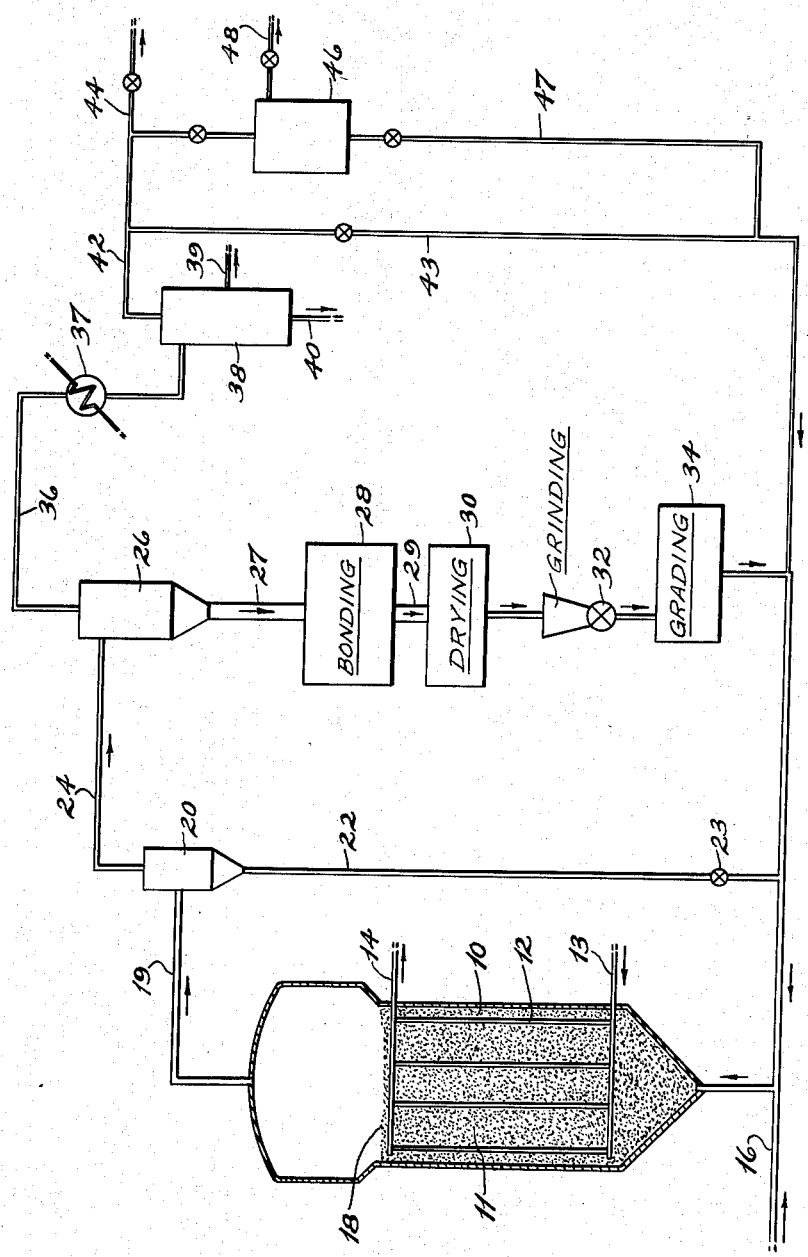
INVENTOR.
C. W. WATSON
BY
ATTORNEYS Patented Nov. 4, 1952

2,616,915

UNITED STATES PATENT OFFICE 2,616,915

STABILIZATION OF FLUIDIZED IRON SYNTHESIS CATALYST

Claude W. Watson, Port Arthur, Tex., assignor to The Texas Company, New York, N. Y., a corporation of Delaware Application October 30, 1947, Serial No. 783,064

5 Claims. (Cl. 260—449.6)

The present invention relates to the synthesis of hydrocarbons, oxygenated hydrocarbons and the like by the catalytic reduction of carbon oxide with hydrogen, and is more specifically concerned with conducting said reaction through the agency of an active catalyst effective to yield high conversions of reactive feed material into normally liquid hydrocarbons without undesirable catalyst disintegration.

In accordance with the present invention, the synthesis of desired liquid products of reaction is effected in the presence of a fluidized iron-containing catalyst possessing high resistance to subdivision resulting from the chemical action of the gases and vapors with which it comes in contact in the reaction zone. To this end, the catalyst is composed of its intimately associated components physically bonded into solid particles of proper size for fluidization under the reaction conditions prevailing in the synthesis operation, the components thereof maintaining their physical integrity under reaction conditions at which high yields of predominantly liquid, desired products of reaction are realized.

The invention is particularly applicable to hydrocarbon synthesis operations wherein the active catalytic component comprises iron and iron-containing compounds effective at temperatures within the range of about 550 to 700° F., for example, and preferably under superatmospheric pressure, as for example, 150 to 300 p. s. i.

In the synthesis of hydrocarbons, the extent of conversion of the reactant feed, expressed, for example, as the percentage conversion of the feed carbon monoxide into desired products containing not less than three carbon atoms in the molecule, has been in the past relatively low. At first this was primarily due to the difficulty of removing the exothermic heat at a rate at which the necessary narrow optimum range of operating temperature can be sustained. With the advent of the fluid catalyst technique, temperature control was improved to the extent where the extent of the reaction could be materially improved. Thus the catalyst, in a state of dense phase fluidization, may be held substantially at a predetermined temperature level by provision of adequate cooling surfaces in contact therewith. So also, by adjusting the reaction conditions and particularly the composition of total feed to the reactor, and by selection of active catalysts, a substantial approach to theoretical yield was made available.

In particular, a material improvement in the degree of conversion to $C_3$ and higher hydrocarbons may be realized by recycling normally gaseous products of reaction or selected components thereof. One such method, disclosed in my copending application, Serial Number 630,521, filed November 23, 1945, contemplates maintenance of a relatively high carbon dioxide recycle which suppresses net carbon dioxide formation and induces high yields of desired liquid hydrocarbons with ultimate disposal of the oxygen largely as water.

However, during extended operation under conditions of high conversion, the usual initially reduced catalyst progressively tends to disintegrate or spall into progressively finer particles. As conversion increases above about 70% on the basis of the carbon monoxide converted into desired liquid products containing at least three carbon atoms, there is a corresponding tendency toward catalyst disintegration, which causes reduction in density of the fluid catalyst bed and lessened turbulence. These result in decrease in the heat transfer rate desirable for good heat control. More significant, however, is the fact that the finely divided particles of spalled catalyst are carried out of the reaction zone as fines, requiring the addition of fresh catalyst make-up at an uneconomical rate. In short, under conditions of high yield of desired products, the catalyst becomes subdivided to a condition where it can no longer be effectively maintained in dense fluid phase in the reaction zone.

The present invention overcomes this effect by providing a catalyst which is adapted to conform with equilibrium catalyst chemical composition without physical degeneration and thus may be subjected to continuous use under conditions required for maximum yields without excessive subdivision. To this end, the catalyst is composed of physically bonded, integral solid particles of suitable physical hardness and strength and of proper size for fluidization.

The catalyst conforming with the equilibrium catalyst chemical composition is formed of the finely divided products of catalyst disintegration and spalling, recovered from a synthesis operation of the above character, carried out under typical reaction conditions, preferably, however, conditions approximating those under which the prepared catalyst is to be employed.

Presumably, the fine particles produced by chemical subdivision in the reaction zone are formed by the spalling of surface layers of the catalyst particles as they approach or reach equilibrium composition. In any event, when bonded into particles capable of fluidization under reaction conditions, they exhibit a marked compatibility with the reactants such that chemical subdivision is prevented.

Physical bonding of the catalytic ingredients into particles of the indicated composition may be effected by cementing, sintering, or otherwise agglomerating an intimately associated mixture thereof by any suitable means, thereafter comminuting or subdividing the agglomerated mass, and then grading to the required mesh size. Alternatively, the mixture may be directly bonded into particles of the required size, as for example, by pelleting.

Agglomeration of the mixed powder into a solid mass may be easily effected through the agency of a suitable refractory cement, such, for example, as any of the typical calcium aluminate hydraulic cements. Any other cementing material substantially free from substantial impairing effect upon the synthesis reaction and resistant to the temperatures employed may, however, be substituted. Silicates such as zirconium silicate provide a somewhat less effective binding agent.

Alternatively, integration of the powder may be accomplished by baking at an elevated temperature, preferably after compacting or agglomerating it with an adherent material such as asphalt dissolved in naphtha. It will be understood that compacting is followed by drying and baking, preferably under a vacuum or under a neutral atmosphere and at temperatures such that the mass possesses the necessary hardness and strength. Similarly, in the preparation of a fired, sintered or calcined product, the asphalt binder may be substituted by an aqueous suspension or slurry of a refractory material such as zirconia or magnesia, produced by prolonged grinding in a ball mill or the like. It will be understood that the slurry is admixed with the powder just in sufficient proportion to permit ready compacting or ramming into a highly compacted mass suitable for drying and firing.

The final integrated composition may be sized and graded by a combination of grinding followed by screening or any other conventional separation. The product thereby produced possesses a physical strength and resistance to abrasion dependant upon the method of integration employed. Where the aforementioned calcium aluminate cement is employed in a typically effective proportion such as one volume of cement for each four volumes of catalyst powder, thereafter permitted to set and then dried, the resulting composition possesses physical resistance to abrasion ideal for fluid catalytic conversion processes, and moreover, being an equilibrium catalyst, is not subject to subdivision by chemical attack.

The specific size of the ultimate particles prepared will vary somewhat, depending upon the specific reaction conditions and particularly the rate of gas flow which will be encountered. Normally, however, the particle size will range between about 60 and 400 mesh, usually finer than about 100 mesh and larger than about 325 mesh.

In use, the catalyst is disposed within a reaction zone as a dense phase fluid mass contacting adequate cooling surfaces supplied internally with a coolant such as water maintained at appropriate temperature. The upflow of gaseous reactants may be relied upon to maintain the particles in a uniform state of dense fluidization, although mechanical adjuncts may be also employed. As above indicated, the reaction zone is held under reaction conditions, as for example, at a temperature of about 600° F. and elevated pressure. The effluent from the reactor is withdrawn from contact with the catalyst at the upper portion of the reaction zone and subjected to condensation and separation of the normally liquid constituents, after which the normally gaseous constituents are recycled as desired to the reaction zone inlet.

As intimated above, the surprising resistance of the present catalyst to spalling during prolonged operation is believed to result from the fact that its composition is substantially in equilibrium with the chemically active agents present in the reaction zone and thus unsusceptible to the disintegrative chemical change which the usual catalysts normally tend to undergo during operation. In this respect, it is to be particularly contrasted with the commonly proposed method of catalyst preparation wherein an iron compound is reduced to metallic iron and may be subjected to a conditioning or carbiding treatment, and thereafter undergoes subdivision in a progressive process involving chemical action analogous to surface rusting of iron or steel exposed to the atmosphere.

In accordance with the present invention, however, the composition comprises constituents in a form physically compatible with the equilibrium conditions.

The foregoing statement of theory is understood to be presented solely to facilitate comprehension of the invention, and not by way of limitation.

In order to form the present catalyst from an approximately equilibrium catalyst composition formed under reaction conditions in the synthesis reaction zone, a suitable product may be recovered by collecting the fine particles which spall or crumble from the introduced catalyst in the course of the synthesis reaction. Thus, when a conventional iron or iron-containing catalyst is used with a high rate of recycle of normally gaseous products, particularly carbon dioxide, such that substantially greater than about 70% of the carbon monoxide fed is converted to $C_3$ and higher products, the surface portions of the catalyst which separate and spall in the form of fine particles are readily recoverable from the gasiform product stream, and may thereafter be formed into particles or pellets of the desired size in the manner disclosed above.

One arrangement suitable for carrying out this process is indicated more or less diagrammatically in the attached drawing wherein the reference numeral 10 designates a synthesis reactor containing a fluidized mass of catalyst 11 of about 200 mesh, for example, which immerses suitable indirect cooling surfaces represented by the exchanger 12. Exchanger 12 is supplied with coolant inlet pipe 13 and the circulating coolant is withdrawn through outlet pipe 14 as a liquid or vapor, in accordance with conventional practices.

The inlet feed to the reactor comprises fresh feed introduced from any convenient source not shown through pipe 16, together with additional recycle streams which will hereinafter be more fully described. The catalyst bed 11 is maintained in a good state of dense phase fluidization by a predetermined upflow of reactants. The products of reaction emerge from the upper pseudo-liquid surface of the dense fluid phase and pass overhead at 19 through the cyclone separator 20 designed to separate any entrained catalyst particles within the range of size suitable for forming the dense fluid phase. These are returned through standpipe 22 and mechanical feeder 23 to the gaseous recycle stream, as will hereinafter be more fully disclosed, for reintroduction to the reaction zone.

The more finely divided particles of catalyst below that size capable of effective fluidization are therefore contained in the gas stream passing out of cyclone separator 20 through pipe 24. These are recovered in a second separator 26.

The thus recovered fines or dust pass by way of standpipe 27 to a cementing plant 28, operated to physically bind the powder into solid chunks of substantial mechanical strength by means of refractory cement in the manner fully disclosed above. The bonded chunks or pieces thereupon are conveyed by means 29 to a dryer 30 where moisture is removed, and thereafter, successively go to a grinder 32 and a screening system 34 from which the particles of the desired catalyst size are delivered. As indicated above, the product may be injected into the recycle line or returned to the reaction zone in any other desired manner. Smaller or larger size particles separated by the screening step 34 may be returned by any means not shown to the cementing plant 28, or may be discarded.

The gaseous products of reaction from which solids have been removed pass from separator 26 through outlet pipe 36 to condenser 37 and thence to separator 38, where the oil layer is recovered as at 39 and the water layer is discharged at 40.

The normally gaseous products removed overhead at 42 are preferably recycled to the reactor via pipe 43 at a suitable rate to maintain the high yields of desired liquid product mentioned above. Any appropriate portion of the gaseous overhead may be vented through branch pipe 44.

It is particularly advantageous, as indicated above, to supply carbon dioxide to the reaction zone. Accordingly, all or a portion of the normally gaseous products of reaction may be conveyed by branch pipe 45 to a gas recovery plant 46, where, for example, a triethylamine absorption system is employed to separate carbon dioxide, and the recovered carbon dioxide stream passes thereafter to recycle line 43 by way of pipe 47. The residual separated gases are discharged through pipe 48.

In the system disclosed, the arrangement of valves permits the recycle streams to be apportioned or controlled as between direct recycle of normally gaseous constituents through pipe 43, and recycle of carbon dioxide by way of branch pipe 47. Accordingly, the concentration of carbon dioxide, as well as other normally gaseous products, in the total feed to the reactor may be controlled within wide limits.

It will be apparent from the foregoing that the recycle stream picks up the product catalyst from the grading system 34 and the separated catalyst from the standpipe 22 and conveys it into the lower portion of the reactor 10. Any suitable injectors or conveying means may be added as desired.

Operating in this way with a substantial recycle of carbon dioxide as taught in my copending applications, Serial Nos. 626,425 and 630,521, the essential by-product of the reaction may comprise the water vapor released at 40, and when using a fresh feed comprising essentially carbon monoxide and hydrogen, only small proportions of undesired gaseous by-products are discharged through pipe 48.

It is to be particularly understood that the cyclone separators 20 and 26 may be substituted by any equivalent fluid-solid instrumentalities such, for example, as magnetic or electrostatic separators, filter systems, gas clarifiers or the like. Similarly, integration of the fine powder into catalyst particles of the desired size may be carried out by any suitable system for particle or pellet formation.

In operation with any typical reduced iron catalyst initially supplied to the reactor 10, a substantial rate of recycle to the reactor and a total feed containing carbon dioxide in such proportion that 80 or 90 per cent of the carbon monoxide supplied is recovered as desired liquid products, a continual chemical subdivision of the catalyst will ensue, resulting ultimately in recovery of substantially all of the catalyst in the form of fines suitable for treatment such that the process of physical bonding into particles of the required size may be effected.

It is particularly important to note that separation of the fines occurs readily from fluid catalyst beds at reactant flow rates usually proposed. Thus, in a typical case, fine powder less than about 400 mesh formed by chemical alteration of an ordinary reduced iron catalyst becomes promptly entrained in the effluent product stream and may be readily separated outside the reaction zone. While the particle size of the separated solids may vary somewhat depending on reaction conditions and particularly the velocity of gas flow in the reactor, such entrainment in any event affords a separation of particles too fine for effective dense phase fluidization, thus automatically retaining within the reaction zone a catalyst mass effective for contacting the reactants in the desired dense phase state. So also, the particle size of the dense phase within the reaction zone affords a suitable measure or approximation of the particle size range to which the physically bonded prepared catalytic particle should be graded for fluidization. In general, therefore, the prepared particles will be in range of coarser than about 400 mesh, with an appropriate increase in size as gas velocities increase. Likewise, as indicated above, the maximum size which determines the other limit of the particle size range, is that which can be caused to become a part of the turbulent fluid phase, by the gas flow or other fluidizing influences encountered in operation.

In accordance with one example, a reaction chamber the same as above is charged with a mass of iron catalyst consisting of iron mill scale of 200 to 300 mesh size containing about 2% alumina ($Al_2O_3$) which has been impregnated with about 1% poatassia ($K_2O$). The catalyst bed is subject to reduction by dry hydrogen at about 1000° F. until no further moisture is evolved. Thereafter, the synthesis reaction is carried out with the passage of fresh feed reactant gas comprising essentially hydrogen and carbon monoxide in the ratio of 2:1. The fresh feed gas is supplemented by a recycle of the normally gaseous products of reaction in a proportion equal to about 2.5 times the rate at which the fresh feed gas is supplied, on a standard volume basis. Temperature is maintained at about 625° F. and pressure at about 200 p. s. i. The internal upflow of total feed gas in the lower portion of the reactor, neglecting the volume occupied by the catalyst particles, amounts to approximately 2 feet per second, whereby the catalyst is maintained in a condition of dense fluidization.

The gasiform reaction products are withdrawn from the upper pseudo-liquid surface of the catalyst, condensed to 70° F., and the liquid constituents separated from the residual gases. The residual normally gaseous stream in excess of the recycle is vented.

After a short period of operation, a substantial quantity of fine particles, smaller than about 400 mesh, appear in the effluent stream of gaseous reaction products. These are separated and cemented, ground and graded, by mixing with 25% by weight of calcium aluminate refractory cement and sufficient water to form a mortar, permitting the mix to set, and thereafter grading to a mesh size of approximately 150–300. The graded particles are continuously returned to the reaction zone. After so treating a quantity of recovered fines approximating the original catalyst capacity of the reactor over a period of about 200 hours, the proportion of fines included in the stream of the reaction products diminishes to a negligible factor which no longer warrants such treatment.

It is contemplated, as intimated in the above example, that the present catalyst may contain any of the conventional activating or promoting agents such as the oxides of the alkali or alkaline earth metals, titania, zirconia, alumina and many others which are usually employed in minor portions as, for example, from 0.5 to 5%. I prefer, however, to include potassia, usually in the range of about 0.5 to 1.5%, and alumina, usually in the range of about 1.5 to 5%. The potassia, or the other ingredients, may be incorporated in any convenient manner as indicated above.

In practicing the present invention, provision is advantageously made for effecting contact between reactants and the catalyst for a contact time and under conditions of good turbulence where the reactants effectively scrub the surface of the catalyst. To this end, relatively deep catalyst beds are to be preferred and high linear velocity of gas flow, above 1.5, preferably above about two feet per second, in an upward direction is best. Thus, stagnation of the gaseous film on the catalyst surface is avoided, with better overall yields. As shown above, however, the rate of gas flow fixes the necessary range of catalyst particle size necessary to attain good dense phase fluidization with characteristic high catalyst turbulence or vibration, efficient surface contact, and high rates of heat transfer.

The present invention, while broadly applicable to any typical synthesis gas, particularly contemplates the use of a fresh reactant feed containing carbon monoxide and hydrogen in a proportion which approximates that required for exclusive reaction with the production of olefins and water. Where the feed is essentially hydrogen and carbon monoxide, the preferred proportions are, therefore, about 2:1, that is, in the range of about 1.5:1 to 2.5:1. However, since, as shown above, high yields of desired liquid products result when substantial proportions of carbon monoxide are included in the feed to the reaction zone, the fresh feed as well as the recycle stream may include substantial proportions of carbon dioxide for consumption in the product of the liquid hydrocarbons.

The term "physically bonding" as used herein means the integration of masses of finely divided solids too fine for effective dense phase fluidization into larger particles of proper size for fluidization by physical means exclusively without alteration in the chemical composition of the finely divided material so that the integrated particles are found together with sufficient hardness and strength to give a high degree of physical integrity and resistance to disintegration.

It is to be noted that the terms "normally liquid hydrocarbons" or "desired products of reaction" are intended to include general hydrocarbons containing at least three carbon atoms, and incidental oxygenated hydrocarbons which are liquid under normal conditions, notwithstanding that the lower molecular constituents of this group may be liquid only as absorbed in higher hydrocarbons, or as subsequently subjected to polymerization or the like.

While the foregoing invention has been described more specifically in connection with certain preferred embodiments, it is to be understood that these are by way of illustration and not by way of limitation; and the invention should not be limited thereto, except as determined by the scope of the following claims.

I claim:

1. In the catalytic synthesis of hydrocarbons, oxygenated hydrocarbons and mixtures thereof, wherein a synthesis gas comprising hydrogen and carbon monoxide is contacted in a reaction zone with a fluidized, solid particle, iron, hydrocarbon synthesis catalyst in a range of particle size effective for fluidization under reaction conditions such that the reactants are converted into high yields of said products of reaction with progressive physical disintegration of the catalyst under the influence of the chemical conditions existing in the reaction zone, into a product substantially finer than the said particle size range, the improvement which comprises recovering the disintegration product of said catalyst, integrating separate masses thereof by physically bonding said masses with added cementitious material, without alteration in the chemical composition thereof, into particles of a size within said range effective for fluidization, said bonded masses disintegration product conforming in chemical composition to the recovered disintegration product and being stabilized against further disintegration, continuing said recovery and physical bonding steps until substantially all the catalyst employed in the reaction is so stabilized against further disintegration, and thereafter ceasing said recovery and physical bonding and subjecting said bonded particles to contact with synthesis gas under reaction conditions to form substantial yields of said products of reaction without substantial disintegration of said particles.

2. The method according to claim 1, wherein contact between said synthesis gas and catalyst is effected in the presence of a substantial portion of carbon dioxide at temperature ranging from about 500–750° F. with a contact time such that about 70 percent of the carbon monoxide passed in contact with the catalyst is converted into said products of reaction.

3. The method according to claim 1 wherein the said bonded particles comprise masses of said disintegration product physically bonded by a cementitious material stable at temperatures in the range of 500–750° F.

4. The method according to claim 1 wherein the said bonded particles comprise masses of said disintegration product physically bonded by a calcium aluminate hydraulic cement.

5. The method according to claim 4 wherein the said bonded particles are in a size range of from about 60–400 mesh.

CLAUDE W. WATSON.

REFERENCES CITED

The following references are of record in the file of this patent:

UNITED STATES PATENTS

| Number | Name | Date |
|---|---|---|
| 2,017,428 | Almquist | Oct. 15, 1935 |
| 2,038,566 | Huettner et al. | Apr. 28, 1936 |
| 2,337,684 | Scheineman | Dec. 28, 1943 |
| 2,369,548 | Elian | Feb. 13, 1945 |
| 2,393,909 | Johnson | Jan. 29, 1946 |
| 2,406,851 | Redcay | Sept. 3, 1946 |
| 2,417,164 | Huber, Jr. | Mar. 11, 1947 |
| 2,445,796 | Millendorf | July 27, 1948 |
| 2,461,570 | Roberts | Feb. 15, 1949 |
| 2,479,420 | Seguro | Aug. 16, 1949 |
| 2,481,841 | Hemminger | Sept. 13, 1949 |
| 2,510,823 | Krebs | June 6, 1950 |